H. S. ROSS.
Cultivator.
No. 102,045. Patented April 19, 1870.
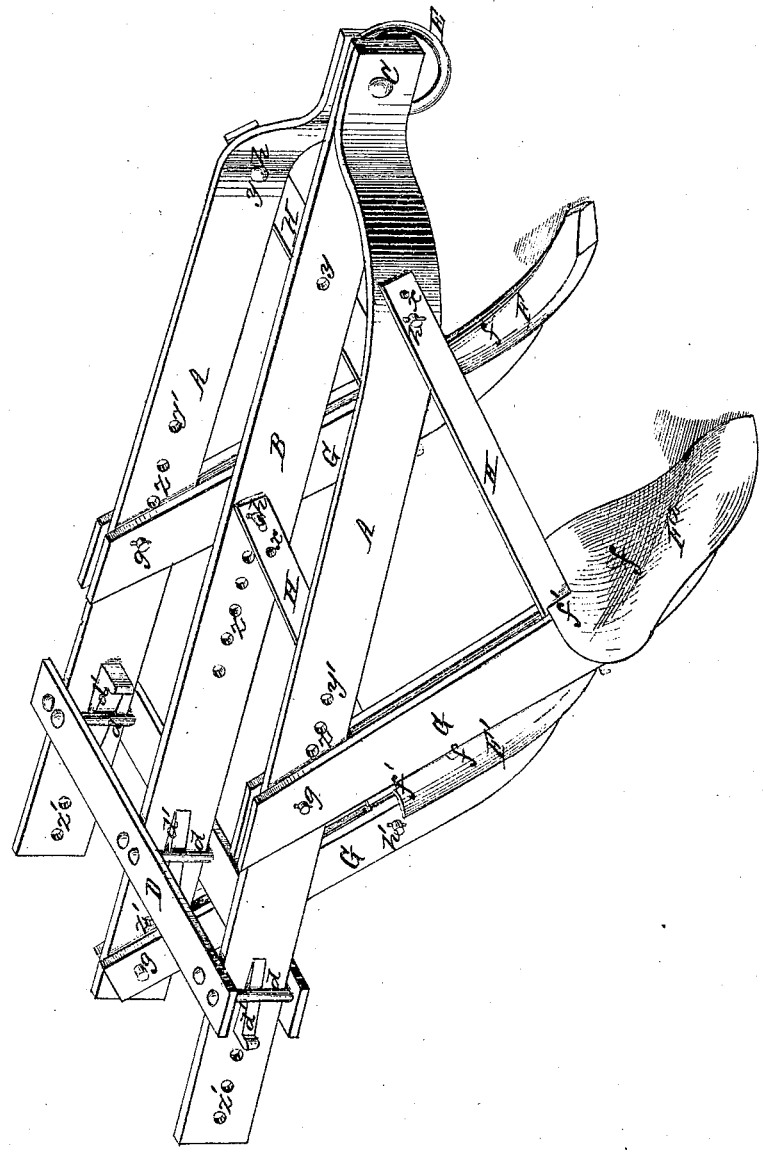
Witnesses
W. B. Deming
Jas. L. Ewin
Hervey S. Ross.
by Knight Bros.
Attorneys

UNITED STATES PATENT OFFICE.

HERVY S. ROSS, OF MILLVILLE, OHIO.

IMPROVEMENT IN CULTIVATORS.

Specification forming part of Letters Patent No. 102,945, dated April 19, 1870.

*To all whom it may concern:*

Be it known that I, HERVY S. ROSS, of Millville, in the county of Butler and State of Ohio, have invented a new and useful Combined Subsoiler and Cultivator, which is described as follows:

The subject of my invention is a drag-cultivator of improved construction, adapted to be converted for a variety of descriptions of work, to be adjusted as required in the most simple manner, and to work at great depth with little resistance.

The frame of the implement, to which the first part of the invention relates, is composed of three, five, or more longitudinal bars united at their front ends by a bolt, which may attach the clevis, and connected behind by a transverse yoke, and each provided with two or more sets of perforations or their equivalent, for the attachment of the standards and their braces.

The teeth or flukes, constituting the second part of the invention, are to scratch up, loosen, or mellow the ground. They are narrow and long in form, and made very stiff and strong. Being narrow, little resistance is occasioned, and they thus penetrate the soil to a great depth without much strain on the team.

The accompanying drawing, forming a part of this specification, represents a perspective view from a point obliquely in front of and above the implement.

A A in the drawings represent a pair of flat metallic bars arranged parallel, or nearly so, at proper distance apart, and forming, alone or in connection with a similar removable center bar, B, the frame of the implement.

C represents a bolt uniting the front ends of the bars A B, and D a yoke connecting their rear ends.

$d\ d$ represent the sockets of the bars A B in the yoke D, and $d'$ wedges for tightening them in said sockets and holding said yoke in place.

E represents a ring, secured by the bolt C and forming the clevis of the implement.

F F' represent teeth or flukes; F$^2$, a shovel; G G, standards of said teeth and shovel, and H H braces of said standards.

$f f$ represent bolts attaching the teeth and shovel F F' F$^2$ to the standards G, and $f' f'$ slots in their upper edge, for the reception of the braces H, to support them laterally.

$g\ g$ represent the attaching pins or bolts of the standards G, and $h\ h$ those of the braces H.

$h'$ represents bolts attaching the braces H to the standards G.

$z\ z'\ z\ z'$ represent perforations in the bars A B, for the reception of the attaching pins or bolts $g$ of the standards G, and $y\ y'\ y\ y'$ a similar provision for the reception of the attaching pins or bolts $h$ of the braces H.

$x\ x$ represent adjusting-perforations in the braces H, for the reception of their attaching pins or bolts $h$. The flukes or teeth F F' are in form long and narrow, being about fourteen inches in length, and in width, F, about one and a quarter inches, and F' about two to three inches. They are made very stiff and strong to take rocks, roots, &c., are suitably curved to enable them to hold in the ground, and operate by scratching up the earth, and thus loosening and mellowing it. Their narrow form adapts them to work at great depth with little strain on the team. The shovel F$^2$ is preferably of the pointed and twisted form represented, to adapt it to enter the ground freely, and throw the earth to the side. One or more of each size of the flukes and of the shovel, it is proposed, shall accompany each implement. The standards G, as shown, are composed of two parallel flat metallic bars with pieces welded between them at their lower ends, for the reception of the bolts $f$, attaching the teeth and shovel, being thus enabled to embrace the bars A B and braces H. The braces H, as shown, consist of flat metallic bars. The yoke D, as shown, is composed of two flat metallic bars united by transverse bolts, which form its sockets $d$.

Metal is preferably employed in the construction of the frame, as described; but wood or other suitable material may be used, the details of construction varying, as required.

It will be seen that by the construction of the frame a very great variety of adjustments of the standards is permitted, and the implement thus adapted for a corresponding variety of uses. Thus, by attaching a standard with a fluke or tooth applied to the middle bar of the frame at its front end, (using the perforations $y\ z$,) and one similarly provided to each side bar at its rear end, using the perforations $y'\ z'$, the implement is adapted for subsoiling or mellowing preparatory to planting corn, potatoes, &c., and transplanting hedge, small fruits, and vegetables.

By arranging a shovel at the front end of one side bar and another at the rear end of the other side bar, a double shovel for cultivating growing crops is formed. By arranging a shovel at the front end of each side bar and a fluke behind each of said shovels, the implement is adapted for draining corn, potatoes, &c. In both the last arrangements the middle bar, which is not required, may be removed. Many other combinations and arrangements will present themselves to the practical farmer.

I propose making the frame of the implement with more than one pair of side bars and a multiplied number of attaching perforations, and supplying it with handles.

Any preferred form of clevis may be employed.

I claim as new—

The construction, combination, and arrangement of the frame A A B C D $d$, the standard-attaching devices $y\ z\ y'\ z'$, and the teeth or flukes F F', all as herein represented and described, for the purposes set forth.

In testimony of which invention I hereunto set my hand.

HERVY S. ROSS.

Witnesses:
　GEO. H. KNIGHT,
　JAMES H. LAYMAN.